Jan. 31, 1967    O. P. HELLEKSON    3,301,219
ANIMAL-OPERATED FEEDING STATION
Filed Dec. 10, 1964
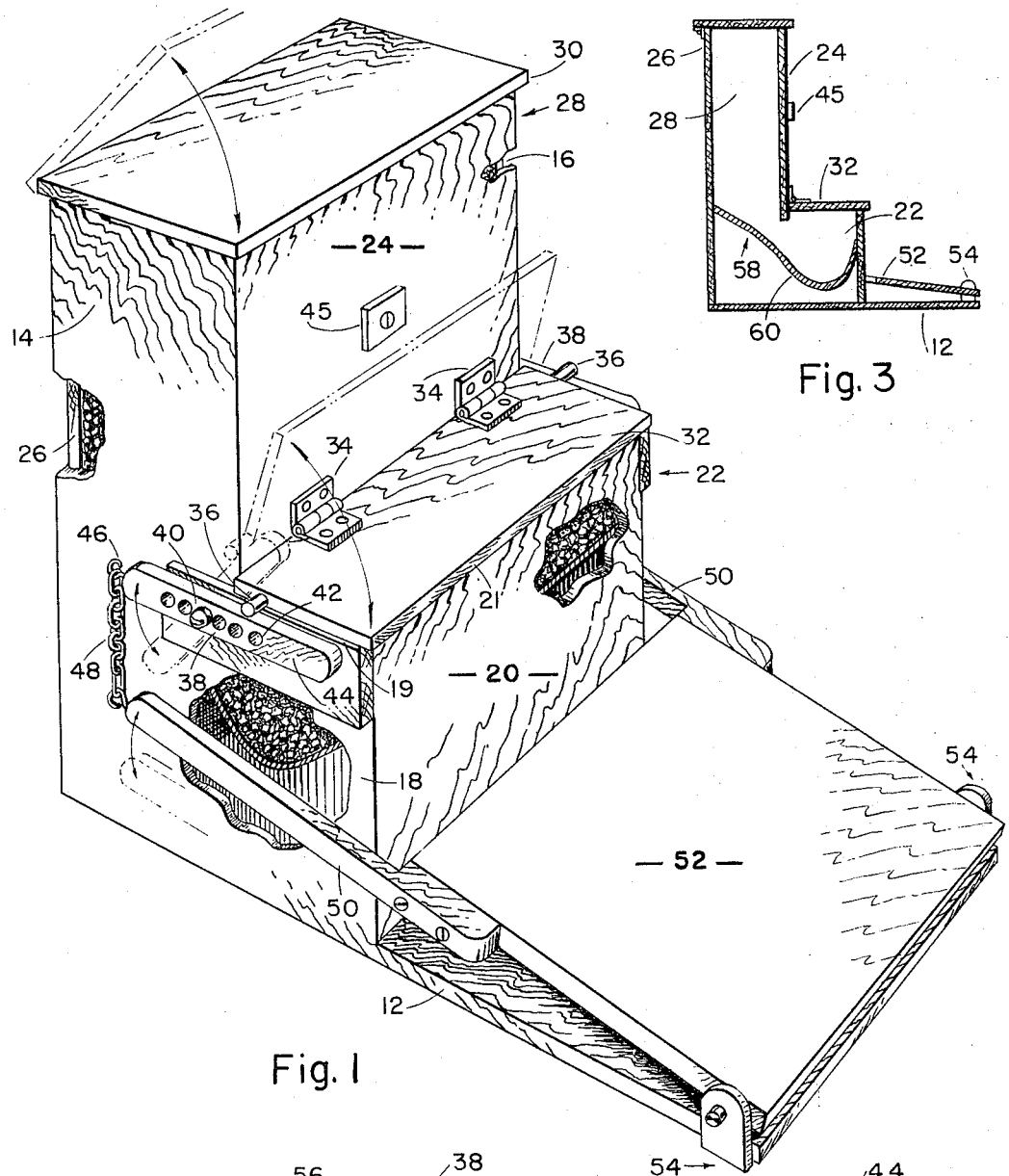
Fig. 3
Fig. 1
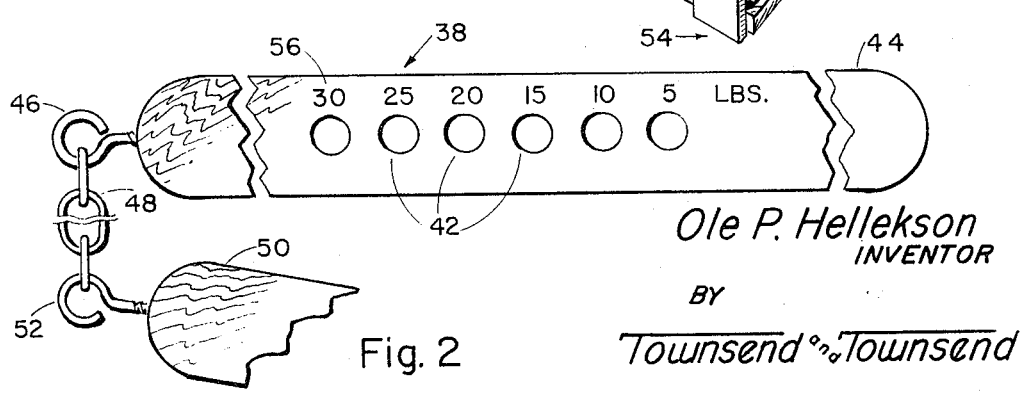
Fig. 2
Ole P. Hellekson
INVENTOR
BY
Townsend & Townsend United States Patent Office 3,301,219
Patented Jan. 31, 1967

3,301,219
ANIMAL-OPERATED FEEDING STATION
Ole P. Hellekson, P.O. Box 1276, Salinas, Calif. 93901
Filed Dec. 10, 1964, Ser. No. 417,340
5 Claims. (Cl. 119—55)

This invention relates to an animal feed container, the contents of which are accessible only to an animal of a certain preselected weight.

The daily attention to feeding of animals, and particularly pets, is frequently burdensome. Prior art efforts to ameliorate the burden have taken the form of closed containers which secure the food against birds and vermin and which can be opened by the pet or animal. Such prior art devices of which I have knowledge include exceedingly complex linkages or structures for enabling the animal or pet to gain access to the container. In addition to the complexity of such prior art structures, provisions for adjusting the linkage in accordance with the weight of the animal are non-existent or extremely difficult and complicated.

Therefore, it is an object of my invention to provide an animal feed enclosure that is normally closed against unwanted vermin and birds, but which can be opened by an animal of a certain minimum preselected weight.

Another object is to provide such feeding station in which an adjustable linkage is provided so that the apparatus can be readily adapted for animals or pets of different weights. Accordingly, entry of unwanted smaller animals into the container is prevented.

Still another object is to provide a feed enclosure having a feed storage chamber into which can be placed a large supply of dry animal feed and which enclosure is so constructed that the feed will be supplied to a trough or feed delivery chamber in a smooth flowing and non-clogging manner. This object is achieved by providing a sloped and rounded bottom partition which forms the bottom wall of both the feed storage chamber and the feed delivery chamber.

The preferred embodiment of the invention which is described in detail hereinafter includes a generally rectangular container having an upwardly facing opening in communication with the feed delivery chamber. Such opening is provided with a hinged cover movable between a position overlying the opening and a raised position at which the contents of the delivery container are accessible to an animal. A treadle on which the animal must stand to raise the hinged cover in gaining access to the delivery chamber is provided forwardly of the container. A linkage extending between the treadle and the hinged cover includes a pair of lever arms having multiple apertures therealong, any preselected one of the apertures being pivotally engageable on a fixed axle on the container wall. Engagement of the various apertures on the axle affords a varying mechanical advantage between the treadle and the cover so that the weight on the treadle that is sufficient to cause opening of the cover can be adjusted in accordance with the weight of the animal in question.

These and other objects, features and advantages will be more apparent after referring to the following specification and accompanying drawings in which:

FIG. 1 is a perspective view of the preferred embodiment of the present invention, with portions broken away to reveal internal details;

FIG. 2 is a detailed view in enlarged scale of my improved cover operating linkage; and FIG. 3 is an elevational cross-section view at reduced scale of the container of FIG. 1.

Referring more particularly to the drawings, reference numeral 12 indicates a generally planar base having opposing side walls 14 and 16 extending thereabove. Each side wall is provided with a stepped portion 18 which terminates in a horizontal edge 19 below the upper extremity of the side walls 14 and 16. Extending between the stepped portions 18 is a front wall 20 that terminates in an edge 21 at the same level as edge 19 to define a feed delivery chamber 22. Behind front wall 20 and extending upwardly from edges 19 of the opening of chamber 22 is an upper front wall portion 24 which, in conjunction with a back wall 26, completes a feed storage chamber generally indicated at 28. A suitable cover 30 is provided for closing the storage chamber 28.

A cover 32 for feed delivery chamber 22 is mounted by hinges 34 to the outer surface of upper front wall portion 24. Cover 32 in its closed or lower position is adapted to rest on edges 19 and 21 of feed delivery chamber 22 so as to exclude unwanted feeders from the chamber. Extending laterally from each side of cover 32 is a stub 36 which extends beyond the outer surfaces of side walls 14 and 16. Although the stubs can be formed integrally with cover 32, they are here shown by way of example as dowel pins or the like. The stubs are adapted to afford a relatively smooth, low friction surface for purposes hereinafter more fully discussed.

Mounted on the outer surfaces of side walls 14 and 16 below protruding stubs 36 are substantially identical lever arms 38. A fulcrum for lever 38 is formed by an axle 40 extending outwardly from the side walls. Axle 40 is here shown by way of example as a screw threadedly engaged in the respective side walls 14 and 16.

Lever arm 38 is provided with a plurality of fulcrum apertures 42 pivotally engageable on axle 40. Accordingly, the mechanical advantage afforded by the lever can be varied depending on which aperture 42 is engaged on axle 40. The upper forward surface of lever 38 is provided with a smooth, low friction surface 44 for sliding contact with stub 36 so that when the forward end of lever 38 is moved upwardly, cover 32 will be opened. Such sliding movement is necessary since axle 40 is disposed at an axis parallelly spaced from the pivotal axes of hinges 34. Consequently, as the lever is pivoted (in a clockwise direction as viewed in FIG. 1) stub 36 slides along surface 44 of the lever arm and the cover 32 is raised. Means are provided to prevent cover 32 from attaining or passing a vertical position to insure closure of the cover by gravity. An exemplary means for accomplishing such function is a spacer block 45 secured to the front surface of panel 24. Obviously the same function can be accomplished by so mounting hinges 34 that vertical orientation of cover 32 is impossible.

At the rear end of lever arm 38, i.e. the end remote from smooth surface portion 44, an attaching member, herein exemplified as a screw eye 46, is disposed for affording securement to the lever of a link 48. Link 48, here exemplified as a chain, is adapted for application of a tension load therealong. The lower end of link 48 is secured to an operating arm 50 by, for example, a screw eye 52.

As shown most clearly in FIG. 1, an arm 50 extends rearwardly from each side of a treadle panel 52 that is pivotally mounted at 54 to the forward edge of planar base 12. Consequently, application of weight to treadle 52 applies tension to link 48, which in turn effects pivotal movement of lever arm 38 and consequent opening of cover 32.

Referring now to FIG. 2, it will be noted that an indicium 56 is associated with each aperture 42, the indicium being a cardinal indicating the number of pounds which must be applied on treadle 52 to open cover 32. The specific location of the holes as well as the length of arms 50 and 38 will determine the specific pressure on the treadle necessary to effect opening of cover 32. Specific dimensions of the arms will occur to those skilled in the art.

To assure an unrestricted flow of feed from storage chamber 28 to delivery chamber 22, I provide a curved bottom wall 58 having a radius or curved portion 60 at the lower extremity thereof and in substantial vertical alignment below cover 32. Partition 58 defines the bottom of storage chamber 28 and delivery chamber 22 and assures that all feed in the storage chamber will be made available to the delivery chamber. One satisfactory material for partition 58 is 20 gauge galvanized steel which has a sufficiently smooth surface to assure free flow of feed to curved portion 60.

The operation of my improved animal feeding station can now be understood. In order to fill the station, cover 30 is lifted and dry food in pellet form or the like is deposited into storage chamber 28. The downwardly curving bottom partition 58 assures that some of the feed so deposited will flow into delivery chamber 52. Lever arms 38 are installed by engaging one of apertures 42, the specific aperture depending on the weight of the animal or pet to be fed, onto axle 40. When the animal approaches the station and steps on treadle 52, tension is applied to link 48 through rigid arms 50 and such tension moves the rear extremity of lever 38 downwardly about axle 40. The forward end of the lever bears against stub 36 and cover 32 is thereby raised. During the upward pivotal movement of cover 32, stub 36 slides along smooth surface portion 44 so that the opening movement is not inhibited. Accordingly, the feed in delivery chamber 32 is made accessible to the animal. When the animal is satiated and withdraws from the station, removal of its weight from treadle 52 permits cover 32 to move by gravity to the closed or downward position, thereby excluding vermin and unwanted smaller animals from the feed supply.

Thus it will be seen that I have provided an extremely simple and efficient animal feeding station. More important, the weight necessary to effect opening of the container cover is readily adjustable by an extremely simple mechanism to the end that unwanted feeders are excluded from the feed supply.

Although one embodiment of my invention has been shown and described, it will be obvious that other adaptations and modifications can be made without departing from the true spirit and scope of the invention.

What is claimed is:

1. An animal feeding station comprising a container including a front wall and a pair of side walls and defining an opening in the top thereof, a cover for said opening, means for hingedly mounting said cover about a horizontal axis remote from said front wall, a treadle mounted for pivotal movement about an axis spaced forwardly of said front wall and below said opening, first and second operating arms rigidly extending from said treadle in general parallel spaced relation to respective said side walls, an operating lever associated with the said arm, means for pivotally mounting each said lever for movement about an axis rearwardly disposed of the axis of hinged movement, a link extending from the rear extremity of said lever to the operating arm associated therewith, and a protuberance extending laterally from each side of said cover for slidably contacting said operating lever forward of the pivotal axis, said lever arm having a plurality of holes therealong for selective engagement with said pivotal mounting means so that the mechanical advantage between said treadle and said cover can be varied in accordance with the weight of the animal using the station.

2. An animal feeding station comprising a planar base, means defining a food container at one end of said base, a cover pivotally mounted with respect to said container defining means for movement between a closed horizontal position and an open upstanding position, a treadle mounted for pivotal movement with respect to said base about an axis remote from said container defining means, first and second arms rigidly extending from said treadle toward said container defining means, first and second levers associated with respective arms and having a plurality of axis defining apertures therealong, means extending from said container for forming a fixed axle receivable in a selected one of said apertures, a pair of protuberances extending laterally from said cover for engaging said lever forward of said axle, a link joining each said arm to said lever at the rear extremities thereof, whereby the weight of an animal on said treadle causes said lever to bear on said protuberance to lift said cover and thereby expose said container to access.

3. An animal feeding station of the type having a container, a hinged cover for selectively covering or exposing the interior of said container and an animal receiving treadle, improved apparatus for operatively linking said treadle to said cover comprising first and second levers mounted on said container for pivotal movement about an axis, each said lever having a plurality of apertures for engaging said axis at one of a plurality of preselected fulcrum points, said cover having a stub extending from each side thereof in overlying relation to said lever so that upward movement of the forward end of said lever raises said cover, a pair of operating arms rigidly affixed to said treadle and extending in underlying relationship to said lever arms, and means for linking said lever arms to said operating arms so that downward movement of said treadle moves the end of said levers remote from said stubs downwardly and the opposite end upwardly against said stubs, thereby causing upward pivotal movement of said cover.

4. An animal feeding station comprising a base, means forming a food container at the rear of said base, a cover hingedly mounted with respect to said container and pivotally movable between a closed horizontal position and an open generally vertical position, a pair of stubs extending laterally of said cover and overhanging said container forming means, a lever arm for engaging each said stub and being mounted for pivotal movement on an axis rearwardly and below said stubs, each said lever arm including a plurality of apertures, any one of which is engageable on said pivotal axis, said pivotal axis being so located that said lever arms reside in a substantially horizontal position when said cover is in the closed position, a treadle mounted forwardly of said container for pivotal movement between an upper sloped position and a lower substantially horizontal position, said treadle having extending rigidly therefrom a pair of arms that extend proximate and below said lever arms adjacent the rear extremity thereof, and means linking each said arm to its associated lever arm so that an animal's weight on the treadle causes downward movement thereof which acts through said lever arm to move said cover to the open position.

5. An animal feeding station comprising a planar base, a pair of mutually parallel spaced apart side walls extending vertically upwardly from said base, a front wall and a rear wall spanning said side walls and forming a feed container, a cover hingedly mounted on said rear wall and movable between a horizontal position overlying the container and a generally vertical position at which the container interior is accessible, said cover having extending laterally therefrom and beyond said side walls a pair of stubs spaced from the axis of hinged movement of said cover, a lever having a first end for bearing engagement with the respective stubs for lifting said cover and a second end, means for mounting each said lever at one of a plurality of selected fulcrum points intermediate the ends thereof so that on downward movement of said second lever end said first end moves up against said stub, and means for urging said second end downwardly in response to arrival of an animal, last said means including a treadle pivotally mounted on said base, a pair of arms rigidly extending from said treadle below said lever arms and means for linking said arms to the second end of said lever arms.

(References on following page)

References Cited by the Examiner

UNITED STATES PATENTS

| | | | |
|---|---|---|---|
| 101,766 | 4/1870 | Richardson | 119—55 X |
| 420,168 | 1/1890 | Rogers | 119—55 |
| 1,116,958 | 11/1914 | Tuttle | 119—55 |
| 1,404,543 | 1/1922 | Rego | 119—55 |
| 2,447,745 | 8/1948 | Eidson | 119—55 |
| 2,560,828 | 7/1951 | Spivey | 119—55 |

FOREIGN PATENTS 4,670   3/1884   Great Britain.

SAMUEL KOREN, *Primary Examiner.*

ALDRICH F. MEDBERY, *Examiner.*